(12) United States Patent
Hauschild et al.

(10) Patent No.: US 8,681,114 B2
(45) Date of Patent: Mar. 25, 2014

(54) METHOD FOR DISPLAYING INFORMATION IN A MOTOR VEHICLE, AND DISPLAY DEVICE

(75) Inventors: Frank Hauschild, Berlin (DE); Mathias Kuhn, Berlin (DE); Rainer Dehmann, Berlin (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 13/285,858

(22) Filed: Oct. 31, 2011

(65) Prior Publication Data

US 2012/0105349 A1 May 3, 2012

Related U.S. Application Data

(63) Continuation of application No. PCT/EP2010/055752, filed on Apr. 28, 2010.

(30) Foreign Application Priority Data

Apr. 30, 2009 (DE) .......................... 10 2009 019 561

(51) Int. Cl.
*G06F 3/041* (2006.01)

(52) U.S. Cl.
USPC ........................................................ 345/173

(58) Field of Classification Search
USPC .................................................. 345/173–178
See application file for complete search history.

(56) References Cited

U.S. PATENT DOCUMENTS

| | | | | |
|---|---|---|---|---|
| 6,819,990 | B2 * | 11/2004 | Ichinose ......................... | 701/36 |
| 2008/0266389 | A1 * | 10/2008 | DeWind et al. ................ | 348/115 |
| 2009/0122007 | A1 * | 5/2009 | Tsuzaki et al. ................ | 345/156 |

FOREIGN PATENT DOCUMENTS

| | | |
|---|---|---|
| DE | 40 01 062 | 7/1991 |
| DE | 41 21 180 | 1/1993 |
| DE | 100 58 244 | 5/2002 |
| DE | 103 05 341 | 8/2004 |
| DE | 601 06 175 | 11/2005 |
| DE | 10 2004 048 956 | 4/2006 |
| DE | 10 2006 028 046 | 12/2007 |
| DE | 10 2007 029 618 | 6/2008 |
| DE | 10 2007 039 445 | 2/2009 |
| EP | 1 207 072 | 5/2002 |

OTHER PUBLICATIONS

International Search Report, dated Sep. 9, 2010, issued in corresponding International Appln. No. PCT/EP2010/055752.

(Continued)

*Primary Examiner* — Sumati Lefkowitz
*Assistant Examiner* — David Tung
(74) *Attorney, Agent, or Firm* — Kenyon & Kenyon LLP

(57) ABSTRACT

In a method for displaying information with the aid of a display mounted in a motor vehicle, graphic data which actuate at least a subregion of the display are generated by a user interface device, such that in an operation state, information assigned to at least one operator step able to be executed by an input device are generated and in a display state, information not assigned to any operator steps is displayed, and it is detected when an object enters an operator control zone assigned to the input device, and when it leaves the operator control zone. The method is characterized in that the user interface device switches from the operating state to the display state when the object leaves the operator control zone and does not reenter the operator control zone within a defined time interval. A display device is adapted for executing this method.

20 Claims, 4 Drawing Sheets

(56) References Cited

OTHER PUBLICATIONS

Written Opinion, issued in corresponding International Appln. No. PCT/EP2010/055752.

International Preliminary Report on Patentability, issued in corresponding International Appln. No. PCT/EP2010/0055752.

German Search Report, issued in corresponding German Patent Appln. No. 10 2009 019 561.0.

* cited by examiner

METHOD FOR DISPLAYING INFORMATION IN A MOTOR VEHICLE, AND DISPLAY DEVICE

CROSS-REFERENCE TO RELATED APPLICATIONS

The present application is a continuation of PCT International Patent Application No. PCT/2010/055752, filed on Apr. 28, 2010, and claims priority to Application No. 10 2009 019 561.0, filed in the Federal Republic of Germany on Apr. 30, 2009, each of which is expressly incorporated herein in its entirety by reference thereto.

FIELD OF THE INVENTION

The present invention relates to a method for displaying information with the aid of a display mounted in a motor vehicle, in which graphic data which actuate at least a subregion of the display are produced by a user interface device, such that in an operating state, information assigned to at least one operator step which is executable by an input device is displayed, and in a display state, information that is not assigned to any operator steps is displayed. Furthermore, it is detected when an object enters an operator control zone assigned to an input device and when the object leaves the operator control zone. In addition, the present invention relates to a display device for a motor vehicle which has a display mounted in the motor vehicle, an input device, and a proximity sensor with whose aid the entry of an object in an operator control zone assigned to the input device is detectable, and also the departure from this operator control zone. Moreover, the display device includes a user interface device which is able to generate graphic data which actuate at least a subregion of the display, such that in an operating state, information assigned to an operator step able to be executed by the input device is displayed, and in a display state, information that is not assigned to any operator steps is displayed.

BACKGROUND INFORMATION

A method and a display device are described in German Published Patent Application No. 10 2007 039 445.

It is desirable to display the information in the motor vehicle such that the driver is able to understand it rapidly and intuitively, so that the acquisition of the displayed information does not distract the driver during driving. Furthermore, the operation should be executable intuitively, easily and quickly such that the driver is also able to operate the devices of the vehicle for which the information is displayed by the display device, while driving, even if possibly complex hierarchical structures are displayable by the display device. The display of information and the operation associated with a display of information in the motor vehicle thus increase the safety while driving the motor vehicle.

SUMMARY

Example embodiments of the present invention provide a method and a display device of the type mentioned in the introduction which simplify the operation of devices of the motor vehicle supported by the display.

According to example embodiments of the present invention, the method is characterized in that the user interface device switches from the operating state to the display state when the object leaves the operator control zone and the object does not reenter the operator control zone within a defined time interval.

In conventional methods, the user interface device directly switches from the operating state to the display state when the object leaves the operator control zone. The object frequently is an operative hand of the driver of the motor vehicle. In this case it may happen that the driver briefly withdraws his operative hand from the operator control zone in order to be able to hold the steering wheel with both hands, although the operator action has not been finalized yet. In this case it is disadvantageous if the display changes directly to the display state as soon as the operator's hand has left the operator control zone. Furthermore, unintended leaving of the operator control zone may occur as a result of vehicle vibrations.

In the method described herein the user may reintroduce his hand into the operator control zone after unintentionally leaving the operator control zone or after a brief control operation of the steering wheel by the operative hand, in order to continue the operator action. In such a case, no unintended switch from the operating state to the display state takes place in the method described herein. This simplifies the operator action for the user because no confusion will arise by a display in the display state that may have occurred in the meantime.

The operating state and the display state are clearly separated from each other in the method described herein. In the display state, no information that is directly related to operating the running application is shown. In particular, no buttons are shown. In the operating state, on the other hand, information that is assigned to at least one operator step which is able to be executed by the input device is displayed. Buttons, in particular, are shown. If required, it is also possible to display information of the display state in the operating state, for which a smaller area on the display is available due to the display of the information for the operating state.

A button within the present context includes a control element of a graphical user interface. A button differs from elements and surfaces for the pure display of information, so-called display elements or display areas, in that they are selectable. Upon selection of a button, a function assigned to this button is executed. The function may lead solely to a change in the information display. Furthermore, it is also possible to use the buttons to control devices whose operation is supported by the information display. The buttons may therefore replace conventional mechanical switches. The buttons may also be produced and displayed as desired on a freely programmable display area. Moreover, it may be provided that a button is able to be marked. In this case the assigned function is not executed yet. Nevertheless, the marked button is highlighted in comparison with other buttons. The marking and/or selection of a button may be implemented by cursor control or by the direct operation of a touch-sensitive display area.

The user interface device may switch from the display state to the operating state when the object enters the operator control zone. This is an intuitive procedure for the operator, so that it is often able to be executed by the driver without requiring him to take his eyes off the driving situation. As a result, the user need not execute a separate operator step in order to switch from the display state to the operating state. Thus, the user will briefly turn his gaze toward the display only after his hand, for example, approaches the input device. He is then already aware of the information of the operating state and able to execute the desired operator step very quickly. The user interface device may subsequently switch back to the display state from the operating state, so that the user is able to see the information of the display of the application that is most important to him and not connected to an operator step on a large surface of the display. For if the user does not intend to execute an operator step, information that visualizes possible operator steps is superfluous. It is not shown in the display state in the method described herein.

The approach of the object may be measured in capacitive manner. The approach of the object may furthermore be measured by infrared radiation. The object, in particular, is a part of the user's body, especially the user's hand or one of his fingers.

At least a portion of the displayed graphical objects may be shown enlarged when switching from the display state to the operating state. This variation of the display in the operating state makes it easier to operate buttons that are displayed in connection with graphical objects. Furthermore, graphical objects that are especially important for the actuation are able to be understood more easily. In addition, the display scale is able to be varied, especially enlarged, when switching from the display state to the operating state.

The operating state in particular pertains to the operation of an application whose display is shown in the display state. This readily allows the user to make a logical connection between the possible operator steps that are visualized in the operating state, and the application of the display state.

Of special importance for the method described herein is the length of the time interval. For one, the time interval must not be too long, so that the display does not remain in the operating state for an unduly long time. On the other hand, the time interval must not be too short in order to avoid an unintended switch to the display state. The situation in the motor vehicle, in particular, must be considered when establishing the length of the time interval. The time interval is adapted in particular to an operation of the input device by the driver of the motor vehicle. A time interval having a length in a range from one second to six seconds takes the special conditions in the motor vehicle into account quite well. The length of the time interval advantageously lies in a range from two seconds to five seconds. A length of the time interval of five seconds is especially preferred.

The speed of the vehicle may be recorded. In this case the length of the time interval may alternatively be specified as a function of the vehicle speed. At higher vehicle speeds, for example, the time interval may be selected longer than at lower vehicle speeds. This is so because at higher vehicle speeds it is often necessary for the driver to interrupt an operating action for a longer period of time in order to control the steering wheel with both hands than would be the case at lower vehicle speeds. In addition, the driver will avert his gaze from the driving action less often at higher speeds, so that a later switchover to the display state is less problematic.

The display device according to example embodiments of the present invention is characterized in that the user interface device switches from the operating state to the display state when the object leaves the operator control zone and the object does not reenter the operator control zone within a defined time interval.

In particular, the display device is adapted to implement the aforementioned method steps either partially or completely.

The user interface device of the display device includes a memory in which the length of the time interval is stored. The stored length of the time interval lies in a range from one second to six seconds, for instance, preferably in a range from two seconds to five seconds and, especially preferred, the stored length of the time interval is five seconds.

The input device may include a touch-sensitive surface of the display. In this case the operator control zone is formed by a region in front of the display, in particular. The user enters the operator control zone via an object or his operative hand, for instance, when the distance to the touch-sensitive surface of the display has dropped below a specific value.

The display device may include an interface for receiving data regarding the instantaneous driving speed. In such a case it is possible to specify the length of the time interval as a function of the vehicle speed with the aid of the user interface device. There is a functional correlation, in particular, between the instantaneous driving speed and the length of the time interval, the time interval preferably being longer at higher speeds than at lower speeds.

Example embodiments of the present invention are explained in more detail below with reference to the appended Figures.

DETAILED DESCRIPTION

Figure 1:
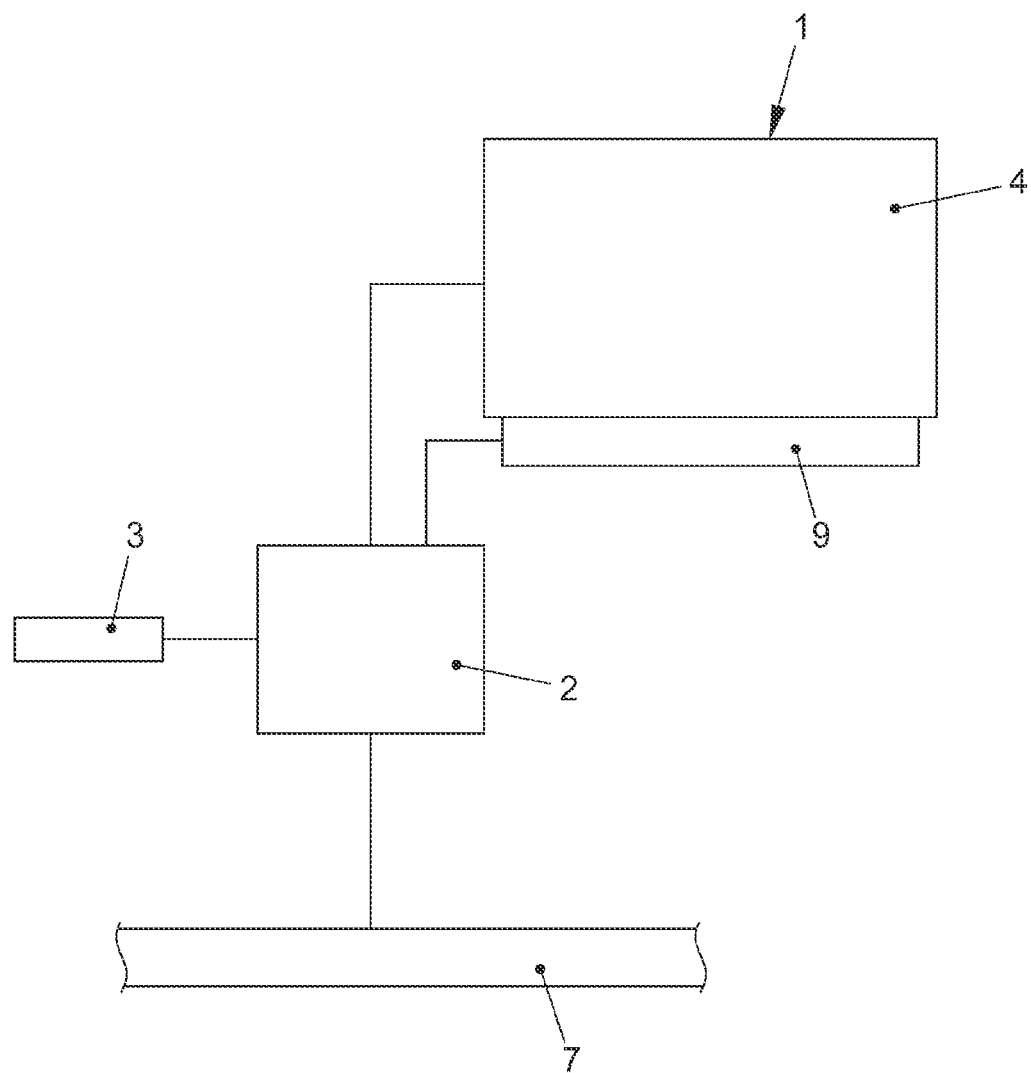
FIG. 1 schematically illustrates a display device according to an example embodiment of the present invention and the linkage of this display device to the electronics of the motor vehicle.

The display device includes a display 1 for the graphical representation of information. Display 1 may be a matrix display, e.g. an LCD (liquid crystal display), especially a color display using TFT (thin-film transistor) technology. Furthermore, the display may be a so-called twisted nematic-liquid crystal display (TN-LCD), a super twisted nematic (STN) display, a double-layer STN, an FLC (ferroelectric liquid crystal) display or an SSFLC (surface stabilized ferroelectric liquid crystal) display. Display 1 has associated backlighting (not shown), which may be provided by one or more light-emitting diodes. Display 1 is freely programmable, i.e. any desired graphic data may be produced, which are represented on display 1.

In particular, display 1 is mounted in an area of the vehicle that is clearly visible at least to the driver. If the operation of the devices of the vehicle is coupled directly to the position of display 1 such that the user must bring e.g. his hand or his finger at least near display 1 in order to make inputs, display 1 is positioned in such a way that the driver of the vehicle may reach it readily with his hand or his finger. Display 1 may be accommodated in the center console of the vehicle for example.

Display 1 is connected to a user interface device 2, by which graphic data are able to be generated for graphical objects displayable on display 1. Furthermore, user interface device 2 is connected to an input device 4, via which the user is able to control devices of the vehicle, the information of which is displayed on display 1.

Input device 4 may be, for example, a device for detecting and evaluating a gesture of a part of a user's body. The hand of the user may perform the gesture in front of display 1, for instance. For this purpose the three-dimensional position of the hand is detected in a specific dwell area in front of display 1, without any need to touch display 1. The allowed dwell area depends on the placement of display 1 in the motor vehicle. The area should be selected such that the presence of the hand of a user in this dwell area may be associated unequivocally with an operation of input device 4. The boundary of the dwell area may be e.g. 40 cm to 10 cm in front of display 1. If the hand of the user is brought up closer to display 1 than this threshold value, this is detected by input device 4, and the approach is interpreted as an operating intention. This causes display 1 to switch from the display state to an operating state, as will be elucidated in the further text. Input device 4 detects the position and the movement of the user's hand in the dwell area. In the process, various gestures performed by the hand are recognized and interpreted as inputs.

Input device 4 may include e.g. infrared light sources and infrared light receivers, which detect the infrared light reflected by the hand. Details of such an input device are described in German Published Patent Application No. 100 58 244, which is expressly incorporated herein in its entirety by reference thereto. Further input devices, which may be used in conjunction with the display device, are described in German Published Patent Application No. 103 05 341 and German Published Patent Application No. 10 2004 048 956.

Furthermore, the position of the hand and its change over time may also be detected by an optical system. In this system, a light-emitting diode emits e.g. square-wave, amplitude-modulated light. This light is reflected by the object to be detected, such as the hand, and reaches a photodiode following reflection. An additional light-emitting diode likewise emits square-wave, amplitude-modulated light to the photodiode, which light is phase-shifted by 180°, however. At the photodiode the two light signals are superposed and cancel each other out if they have exactly the same amplitude. If the signals do not cancel each other out at the photodiode, the light emission of the second diode is regulated via a control loop in such a way that the total received signal adds up to zero again. If the position of the object changes, there will also be a change in the light component that arrives at the photodiode from the first light-emitting diode via the reflection on the object. This causes a correction of the intensity of the second light-emitting diode through the control loop. The control signal therefore is a measure for the reflection of the light emitted by the first diode, on the object. In this manner, it is possible to derive a signal that is characteristic of the position of the object from the control signal.

In addition, the input device may be a touch-sensitive film, which is provided on display 1. The film makes it possible to detect the position at which display 1 situated behind the film is touched. The film may be implemented e.g. as a resistive touch film, a capacitive touch film or as piezoelectric film. Furthermore, the film may be adapted so as to measure a heat flow emanating from the finger of a user, for example. Various inputs may be obtained from the arrangement of the touch of the film over time. In the simplest case, for example, touching of the film at a specific position may be allocated to a graphical object shown on display 1. Furthermore, sliding movements of the finger across the film may be interpreted. In particular, the user is able to define a line on display 1 in this manner, in that he touches the film at one point, slides on the film toward another point and removes the finger from the film at the other point.

User-interface device 2 is also connected to a vehicle bus 7. User-interface device 2 is connected to driver-assistance systems of the vehicle via vehicle bus 7. User-interface device 2 receives data from these driver-assistance systems via vehicle bus 7, and processes these data so that they are graphically displayed to the driver or the vehicle occupants via display 1.

For this purpose user interface device 2 produces graphic data for objects displayable on display 1, which, inter alia, graphically represent the information of the driver assistance systems. Via vehicle bus 7, user interface device 2 is furthermore connected to various information, communication and entertainment devices of the vehicle. The varied information from these devices of the vehicle is processed in user interface device 2 and converted into graphic data for a graphical representation.

If the approach of an object is not detected by input device 4 itself, then a separate proximity sensor 9 is provided, with whose aid the approach of an object toward input device 4 is detected. Proximity sensor 9 is connected to user interface device 2. Proximity sensor 9 transmits a signal to user interface device 2 when an object has come so close to input device 2 that a preset threshold value is not attained. Proximity sensor 9 defines an operator control zone in front of input device 4. If input device 4 is implemented as touch-sensitive surface of display 1, then the operator control zone extends into the space in front of the touch-sensitive surface of display 1, up to a specific distance in front of this surface.

In addition, user interface device 2 is connected to a memory 3. For one, memory 3 is able to store data used by user interface device 2 for generating graphical data to be displayed on display 1. For another, memory 3 may store a time interval which is used by user interface device 2 in the switch from the operating state to the display state, as is going to be explained in the further course of the text.

Examples for displays which are generated by the method hereof by the afore-described display device are described in more detail in the following text.

Figure 2A:
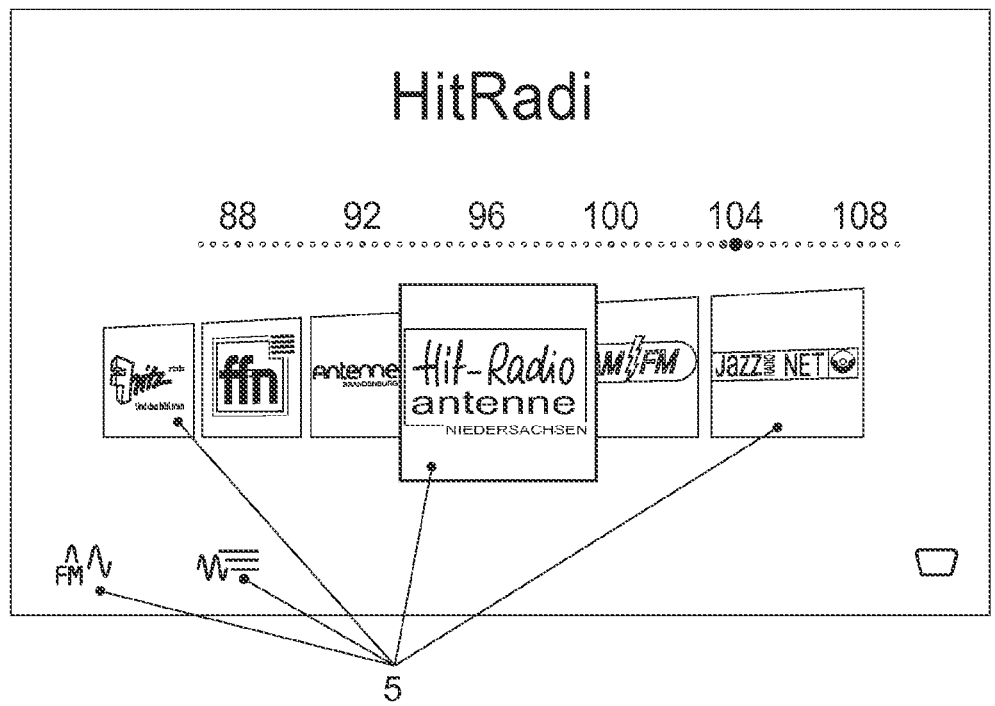
FIGS. 2A and 2B show a display in the display state and a display in the operating state, produced by a method according to an exemplary embodiment of the present invention.

FIG. 2A shows an information display in a display state which is generated in connection with the operation and control of a radio of the motor vehicle using the method hereof. Graphical objects 5 are displayed for the various radio stations currently able to be received by the radio. One selected radio station is shown in the foreground. Other radio stations are shown in the background. A frequency scale is displayed in addition. The selected radio station is furthermore also shown alphanumerically. Moreover, there are various display fields 5, which are transformed into buttons in a change to the operating state.

Figure 2B:
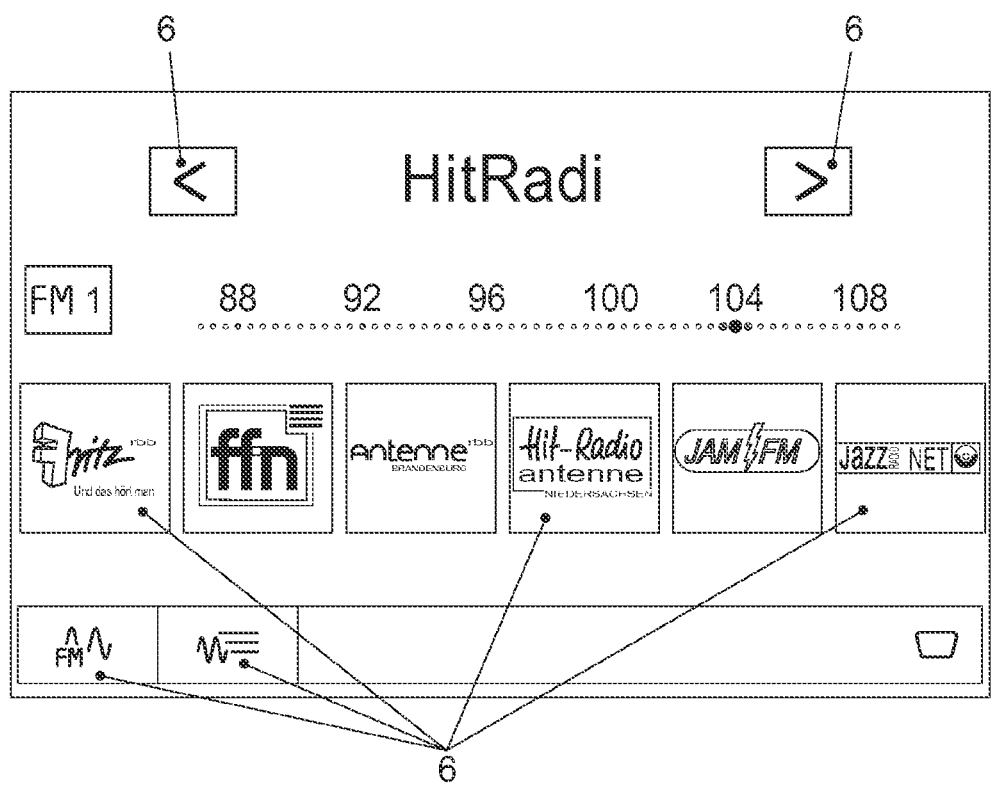

If the user wants to select a different radio station, his hand approaches the touch-sensitive surface of display 1. If he enters the operator control zone that is defined in front of display 1, then the information display changes to the operating state. The information display in the operating state is shown in FIG. 2B. Graphical objects 5, which in the display state were used only for displaying information and which were not linked to any operator steps, are at least partially converted into buttons 6, which the user is able to actuate. In this case, graphical objects 6 for the radio stations are displayed at the same size next to each other and in one row in the operating state. Furthermore, buttons 6 are partially displayed in enlarged size so that it is easier for the user to select them by touching the touch-sensitive surface of display 1. Furthermore, as the case may be, additional buttons 6 are displayed, which have no correspondence in the display state.

If the operative hand of the user is located within the operator control zone, the user is able, for example, to scroll through the available radio stations. In addition, the user may select a new radio station, for instance. If the user removes his operative hand from the operator control zone during the operator action, a counter is started in user interface device 2. The counter measures the time that has elapsed since the operative hand of the user has left the operator control zone. If the counter reaches the length of a defined time interval, which is stored in memory 3, and if the operative hand of the user does not reenter the operator control zone within this time interval, user interface device 2 changes the information display on display 1 such that the information is shown in the display state again, as illustrated in FIG. 2A. However, a different selected radio station may possibly be shown in the foreground.

On the other hand, if the user's operative hand reenters the operator control zone within the time interval stored in memory 3, then user interface device 2 does not modify the information display. In addition, the counter will then be reset to the zero value.

The length of the time interval stored in memory 3 may be, e.g., five seconds. If required, however, a different value for the length of the time interval may be stored in memory 3. In addition, user interface device 2 may calculate the length of the time interval as a function of the vehicle speed, which is transmitted to user interface 2 via vehicle bus 7.

Figure 3A:
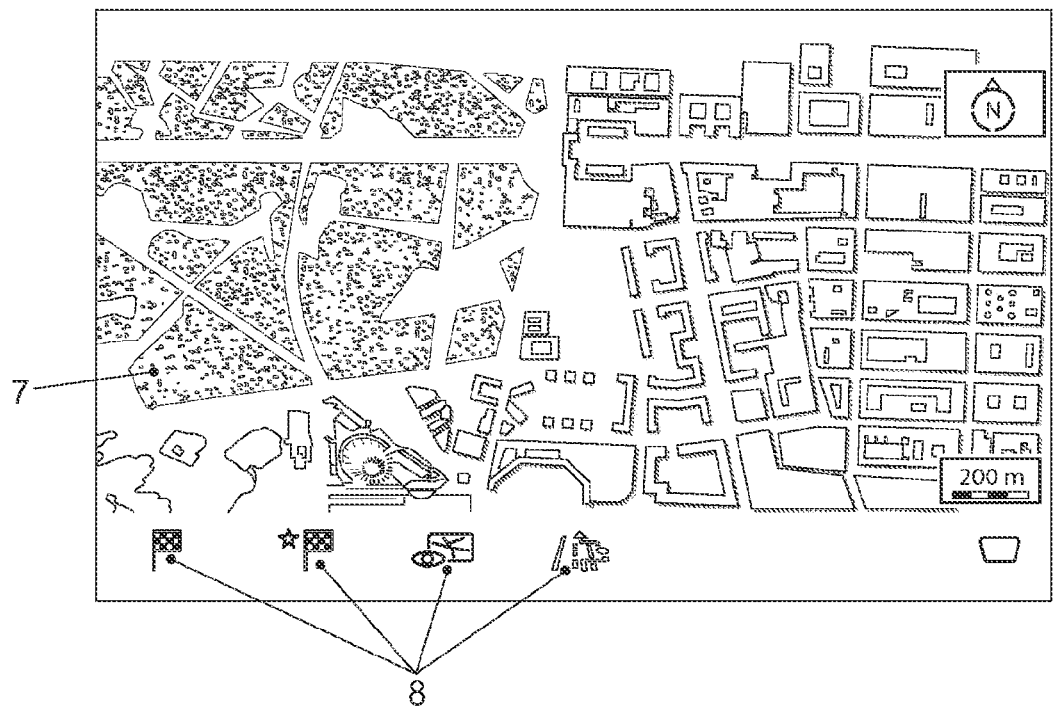
FIGS. 3A and 3B show additional displays in a display state and an operating state, produced by a method according to an example embodiment of the present invention.
Figure 3B:
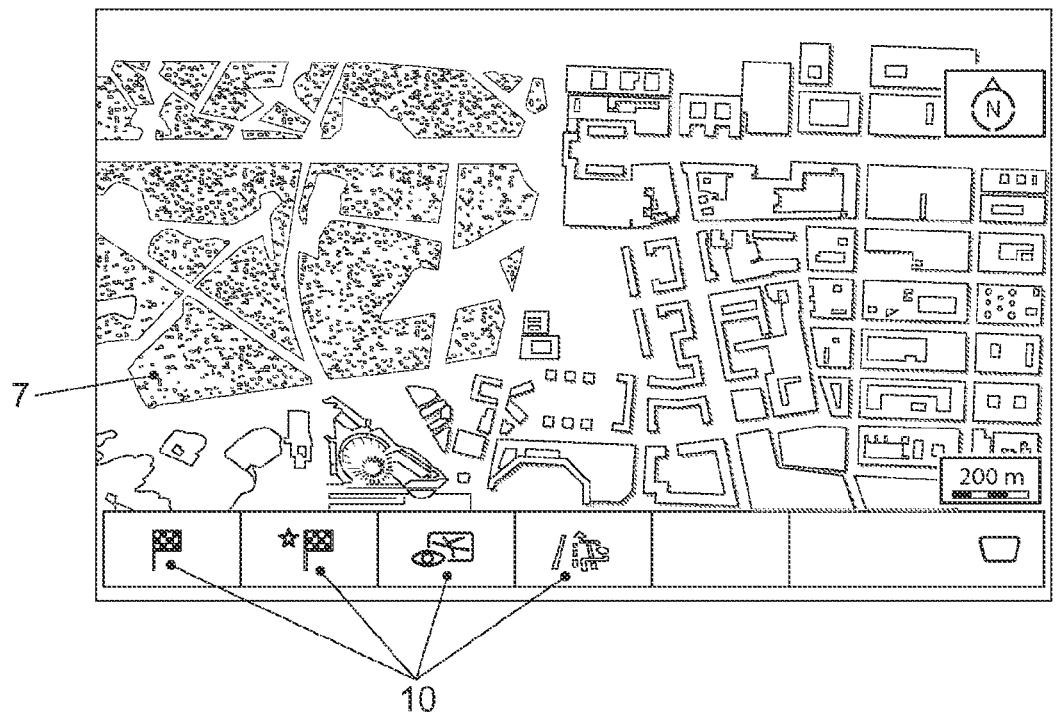

FIGS. 3A and 3B show another example for the display of information in the display state (FIG. 3A), and in the operating state (FIG. 3B). In the display state, a geographical map 7 is shown for the navigation system of the vehicle. Furthermore, graphical objects 8 are shown underneath geographical map 7, which may not be assigned to any operator steps in the display state, but which visualize possible operator steps that are able to be executed in the operating state.

If the user approaches the touch-sensitive surface of display 1 via an object, e.g., his operative hand, the information display switches to the operating state when the operator control zone is entered, as shown in FIG. 3B. The cutaway shown by geographical map 7 gets smaller in such a case. In addition, graphical objects 8 become larger and turn into buttons 10 to which a specific function is assigned for the operation of the navigation system.

As already described with reference to FIGS. 2A and 2B, the information display changes back to the display state when the object, i.e., the operative hand of the user, leaves the operator control zone and does not reenter the operator control zone within the time interval. If the object or the operative hand reenters the operator control zone before the time interval has elapsed, the information display will not be changed and remains in the operating state.

Figure 4A:
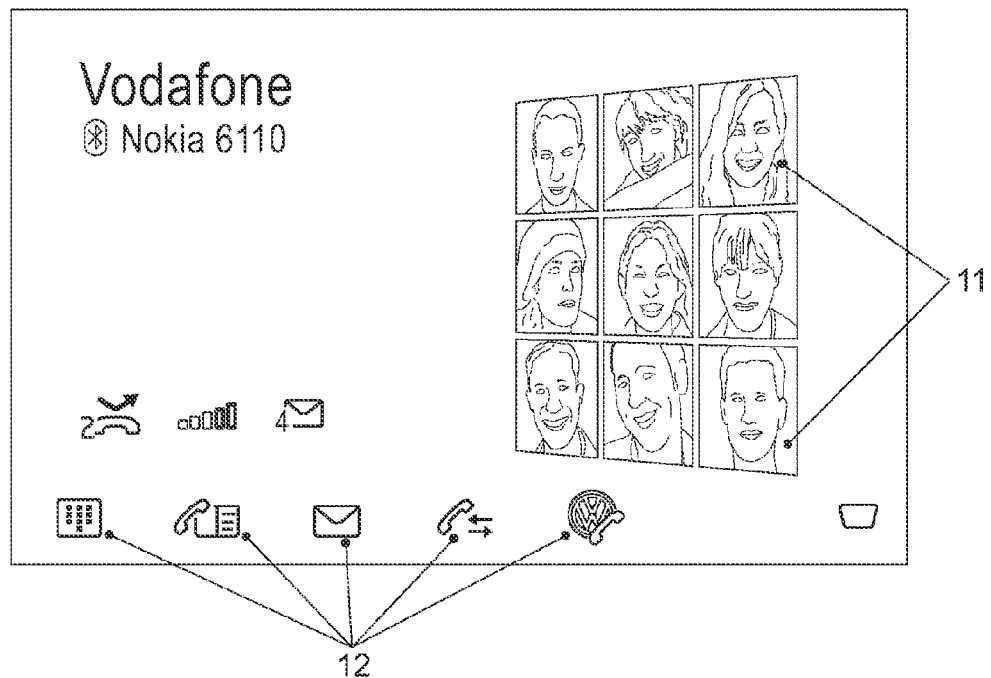
FIGS. 4A and 4B show additional displays in a display state and an operating state, produced by a method according to an example embodiment of the present invention.
Figure 4B:
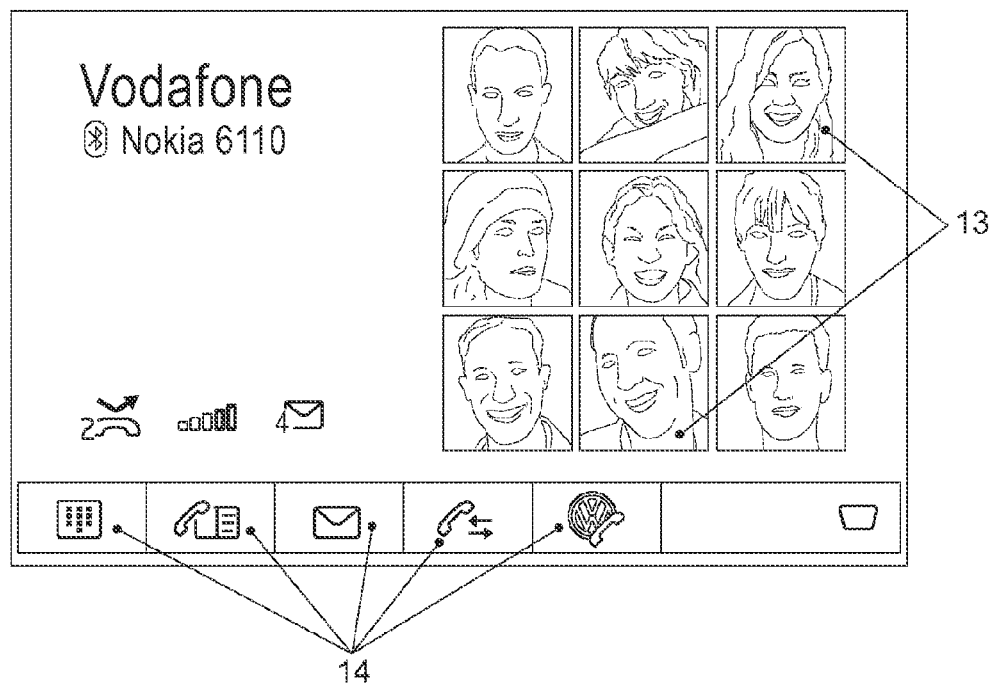

FIGS. 4A and 4B show another example for the display in the display state (FIG. 4A), and in the operating state (FIG. 4B). In the display state, as shown in FIG. 4A, graphical objects 11 for contact persons are displayed. In addition, graphical objects 12 are shown, which are not assigned to any operator steps in the display state, but which correspond to possible operator steps.

If the user enters the operator control zone via an object or his operative hand, the display switches to the operating state, as shown in FIG. 4B. Graphical objects 11 are no longer shown in a perspective view, but as squares of identical size. In addition, these graphical objects are transformed into buttons 13 which the user may operate in order to select a specific contact and, for example, to establish a mobile telephony connection to a stored telephone number of this contact person. Different buttons 14 for operating the mobile telephone of the motor vehicle are shown as well.

As in the previous examples, user interface device 2 reverts from the operating state to the display state when the object or the operative hand leaves the operator control zone and does not reenter the operator control zone within a defined time interval. If the object reenters the operator control zone after leaving it and before the time interval has elapsed, the information display remains unchanged in the operating state.

LIST OF REFERENCE NUMERALS 1 display
2 user interface device
3 memory
4 input device
5 graphical object
6 button
7 geographical map
8 graphical object
9 proximity sensor
10 button
11 graphical object
12 graphical object
13 button
14 button

What is claimed is:

1. A method for displaying information with the aid of a display mounted in a motor vehicle, comprising:
generating, by a user interface device, graphic data which actuate at least a subregion of the display such that in an operating state, information which is assigned to at least one operator step executable by an input device is displayed, and in a display state, information which is not assigned to any operator steps is displayed, and it is detected when an object enters an operator control zone assigned to the input device and when it leaves the operator zone;
switching the operator interface device from the operating state to the display state when the object leaves the operator control zone and the object does not reenter the operator control zone within a time interval;
detecting a speed of the vehicle; and
determining a length of the time interval as a function of the vehicle speed;
wherein the function provides for a greater determined length of the time interval for higher vehicle speeds and a shorter determined length of the time interval for lower vehicle speeds.

2. The method according to claim 1, wherein when the object enters the operator control zone, the user interface device switches from the display state to the operating state.

3. The method according to claim 1, wherein when a switch takes place from the display state to the operating state, at least a portion of the displayed graphical objects is shown in enlarged size.

4. The method according to claim 3, wherein a length of the time interval is within a range of one second to six seconds.

5. The method according to claim 3, wherein a length of the time interval is within a range of two seconds to five seconds.

6. The method according to claim 1, wherein the display scale is modified in the switch from the display state to the operating state.

7. The method according to claim 6, wherein a length of the time intervals is within a range of one second to six seconds.

8. The method according to claim 6, wherein a length of the time interval is within a range of two seconds to five seconds.

9. The method according to claim 1, wherein a length of the time interval is within a range of one second to six seconds.

10. The method according to claim 1, wherein a length of the time interval is within a range of two seconds and five seconds.

11. The method according to claim 1, wherein a length of the time interval is five seconds.

12. The method according to claim 1, wherein the input device includes a touch-sensitive surface of the display.

13. The method of claim 1, wherein the display state only includes the display of information not assigned to any operator steps.

14. The method of claim 1, wherein the operating state further includes display of information not assigned to any operator steps.

15. A display device for a motor vehicle, comprising:
a display mounted in the motor vehicle;
an input device;
a proximity sensor adapted to detect an entry of an object in an operator control zone assigned to the input device and a departure from the operator control zone; and
a user interface device adapted to generate graphic data to actuate at least a subregion of the display such that in an operating state, information assigned to an operator step executable by the input device is displayed, and in a display state, information that is not assigned to any operator steps is displayed;
wherein the user interface device is adapted to switch from the operating state to the display state when the object leaves the operator control zone and the object does not reenter the operator control zone within a time interval;
wherein the display device includes an interface adapted to receive data of an instantaneous vehicle speed, and user interface device is adapted to determine a length of the time interval as a function of the vehicle speed;
wherein the function provides for a greater determined length of the time interval for higher vehicle speeds and a shorter determined length of the time interval for lower vehicle speeds.

16. The display device according to claim 15, wherein the user interface device includes a memory adapted to store a length of the time interval is stored.

17. The display device according to claim 16, wherein the length of the time interval stored in the memory is within a range of one second to six seconds.

18. The display device according to claim 15, wherein the input device includes a touch-sensitive surface of the display.

19. The method of claim 15, wherein the display state only includes the display of information not assigned to any operator steps.

20. The method of claim 15, wherein the operating state further includes display of information not assigned to any operator steps.

* * * * *